Sept. 11, 1962  T. KRALT ETAL  3,053,894
ALKYLENE DI-AMINES
Filed Oct. 19, 1956  2 Sheets-Sheet 1
FORMULA I
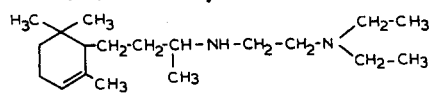
FORMULA II
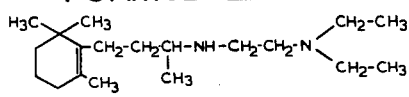
FORMULA III
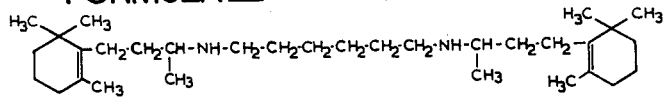
FORMULA IV
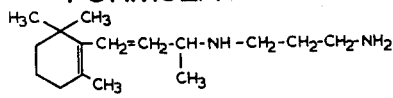
FORMULA V
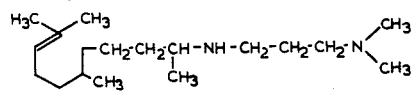
FORMULA VI
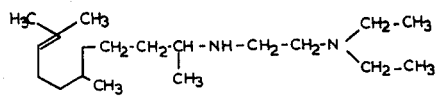
FORMULA VII
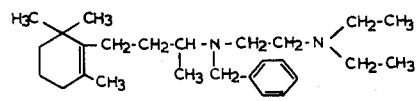
FORMULA VIII
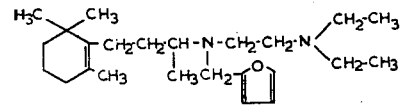
FORMULA IX
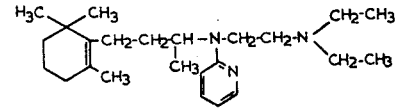
INVENTORS
TEUNIS KRALT
JAN VAN DIJK
BY
*Frank R. [signature]*
AGENT

FORMULAE
FORMULA A
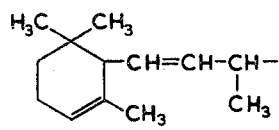
FORMULA B
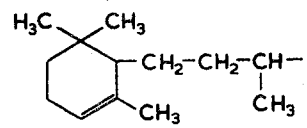
FORMULA C
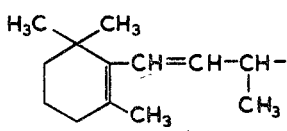
FORMULA D
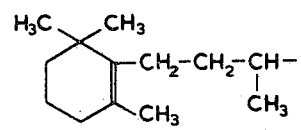
FORMULA E
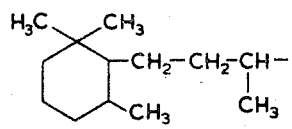
FORMULA G
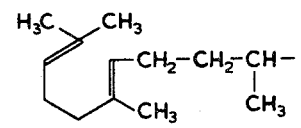
FORMULA H
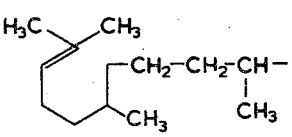
FORMULA J
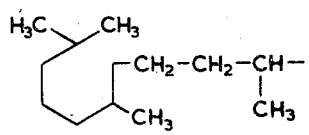
FORMULA K
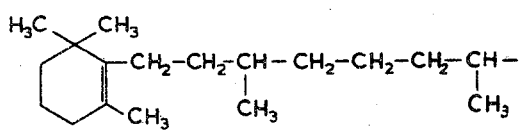
INVENTORS
TEUNIS KRALT
JAN VAN DIJK
BY
AGENT 3,053,894
ALKYLENE DI-AMINES
Teunis Kralt and Jan van Dijk, Weesp, Netherlands, assignors, by mesne assignments, to North American Philips Company, Inc., New York, N.Y., a corporation of Delaware
Filed Oct. 19, 1956, Ser. No. 616,959
Claims priority, application Netherlands Nov. 24, 1955
3 Claims. (Cl. 260—563)

The invention relates to a method of producing alkylene di-amines of the general formula

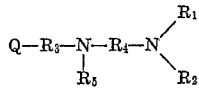

In this formula Q designates a saturated or unsaturated, aliphatic or mixed aliphatic-alicyclic radical, composed of two isoprene radicals. $R_3$ is a saturated or an unsaturated isopropyl radical of one of the formulae

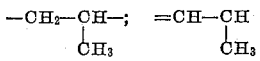

$R_4$ is an alkylene radical, containing 1 to 8 carbon atoms and $R_5$ designates a hydrogen atom or a benzyl-, furfuryl- or pyridyl radical.

To this group of substances belong, for example, compounds in which the radical $QR_3$ is an α-ionyl (Formula A), dihydro-α-ionyl (Formula B), β-ionyl (Formula C), dihydro-B-ionyl (Formula D), pseudo-ionyl, dihydropseudo-ionyl (Formula G), tetrahydro-pseudo-ionyl (Formula H) or a hexahydro-pseudo-ionyl (Formula I) radical, $R_4$ designates an ethylene, propylene or hexamethylene radical, $R_5$ one of the radicals mentioned above and $R_1$ and $R_2$ designate either each a hydrogen atom or each a methyl-, or ethyl-radical. We may mention N, N-diethyl - N' - {1-methyl-3-(2',6',6'-trimethyl-cyclohexene-2'-yl) propyl} ethylene di-amine; N,N'-bis{1-methyl-3-(2',6',6'-trimethylcyclohexene-1'-yl) propyl} hexamethylene di-amine; N-furfuryl-N-(di-hydro-β-ionyl)-N',N'-diethylethylene di-amine.

The compounds according to the invention, in which $R_5$ is a hydrogen atom, may be produced by reducing a compound of the formula

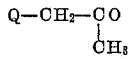

or

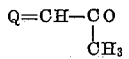

with hydrogen and a metal catalyst in the presence of equimolar quantities of an amine of the formula:

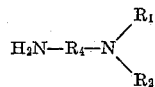

in which formula $R_1$ and $R_2$ designate hydrogen or an alkyl radical, for example a methyl-, or ethyl-radical.

In this method for example α-ionone, dissolved in absolute ethanol, is caused to react in the presence of hydrogen and a platinum catalyst, with a solution of N,N-diethylethylene di-amine in absolute alcohol. The reaction may be carried out at room temperature under substantial normal pressure.

As an alternative, a compound of the formula

may be caused to react with an at least twice as large a molar quantity of a compound of the formula

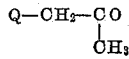

or

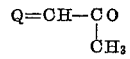

also in the presence of hydrogen and a metal catalyst. By this method compounds are obtained in which the structure of the carbon-nitrogen skeleton is symmetrical. An example is the reaction between hexa-methylene di-amine and twice as large a molar quantity of β-ionone.

All these reactions are preferably carried out in a solvent. Aliphatic alcoholic solvents are usually suitable to this end. Use is, however, preferably made of ethanol.

As a metal catalyst Raney nickel may be used. In many cases it is advisable to use platinum or palladium in a finely divided state as a catalyst, since when using these catalysts the operational conditions are usually less severe than with the use of Raney nickel. The hydrogenation in the presence of Raney nickel must be carried out in alkaline milieu, preferably at a pH of 8 to 12, since in the case of acids the catalyst is decomposed. For the production of the secondary or tertiary amines in the presence of this catalyst, often higher temperatures, for example of 40° C. to 150° C. and higher pressure are desired in order to obtain an optimum yield, for example a pressure between 20 and 150 atmospheres. Under these severer conditions double bonds contained in the starting material may be completely hydrogenized, which is not the case, if the reduction is carried out with the aid of hydrogen under the action of Raney nickel at room temperature under normal pressure.

The use of high pressure requires the use of autoclaves, which is frequently undesirable. However, if platinum or palladium is used as a catalyst, the hydrogenation may be carried out at room temperature under normal pressure in order to obtain completely hydrogenized secondary and tertiary amines.

The hydrogenation under the action of platinum or palladium may be carried out in alkaline, neutral or acidic milieu. If one of the reaction components for example α- or β-ionone, contains one or more double bonds, no complete hydrogenation of the available double bonds takes place in alkaline or neutral milieu. Thus, of the said compounds only the exocyclic double bonds are hydrogenized. However, if the hydrogenation is prolonged in acidic milieu, for example, by adding hydrochloric acid, or if the reaction takes place from the beginning in an acidic milieu, for example at a pH of about 1 to 3, all double bonds are hydrogenized (for further details reference may be made to Org. Reactions of Roger Adams, vol. 4, pages 174 and ff.).

The compounds according to the invention may furthermore be produced by reacting a compound of the general formula Q—$R_3$—NH—$R_5$ with a compound of the general formula

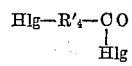

In these formulae the radicals Q—$R_3$—, $R_5$ have one of the aforesaid meanings. Hlg represents a halogen atom, preferably a chlorine atom and the radical $R_4'$—CO is a radical with the same carbon skeleton as the radical $R_4$. In this reaction a halogenated acyl-amino compound is formed, which permits of being converted with a compound of the formula

into a compound of the formula

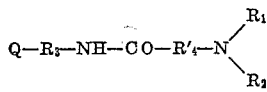

This reaction is preferably carried out in a manner such that the halogenated acyl-amino compound is dissolved in a surplus quantity of the compound of the formula $HNR_1R_2$. The excess of the last-mentioned amine serves not only as a solvent but also as a binder of the hydrogen halide set free. By reduction with a complex metal hydride containing two metal atoms, for example lithium-aluminium hydride, sodium-boron hydride, the product obtained by the last-mentioned reduction may be converted into the compounds according to the invention. This reaction is preferably carried out in an etheric solution, an etheric solution of the compound to be reduced being added to a suspension of a reducing agent in an ether, for example di-ethyl ether at a temperature of about 0 to 50° C. According to this method for example a compound of the formula N,N-diethyl-N'-(2-furfuryl-methyl) - N' - {1-methyl-3-(2',6',6'-trimethylcyclohexene-1'-yl)propyl} ethylene di-amine may be produced by adding to a solution of N-furfuryl-dihydro-β-ionyl amine in benzene containing pyridine a solution of monochloro-acetylchloride also dissolved in benzene. This produces: N-(2-chloracetyl)-N-furfuryl-dihydro-β-ionyl-amine. This compound is dissolved in a large surplus of di-ethyl amine, so that N-(2-diethyl-amino-acetyl)-N-furfuryl-dihydro-β-ionyl amine is obtained. This substance was dissolved in di-ethyl ether and this solution was added to a suspension of lithium-aluminium hydride in ether.

The compounds, in which $R_5$ is a benzyl, a furfuryl or a pyridine radical may be produced by causing the compounds of the general formula

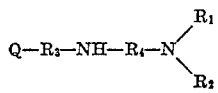

obtained for example by one of the aforesaid methods, to react with a compound of the formula $HlgR_5$, wherein Hlg is a halogen atom, preferably a chlorine atom. The reaction is preferably carried out in a solution. It may be advisable to cause the di-amine to react in a large surplus quantity with a compound of the formula $HlgR_5$, since under these conditions the hydrogen halide set free is bound by the surplus di-amine and can therefore not interfere with the further reaction. According to this method for example N,N-di-ethyl N',-benzyl-N'- {1-methyl-3-(2',6',6'-trimethyl-cyclohexene-1'-yl) propyl}-ethylene diamine may be produced from an ethanolic solution of N,N-di-ethyl-N'-(dihydro-β-ionyl)-ethylene di-amine and a solution of benzyl-chloride in absolute ethanol.

It has been found that these compounds according to the invention have a spasmolytic activity which is 2 to 7 times that of papaverine.

EXAMPLE I

N-(2-Diethyl-Aminoethyl) Dihydro-α-Ionyl Amine N,N-Diethyl-N' - [1 - Methyl - 3 - (2',6',6'-Trimethyl-Cyclohexene-2-Yl) Propyl]-Ethylene Di-Amine (Formula I)

9.75 gs. of α-ionone (0.05 mol), dissolved in 50 mls. of absolute ethanol, was added to 6 gs. of N,N-diethyl-ethylene-di-amine (0.05 mol), dissolved in 40 mls. of absolute ethanol. To this solution was added a suspension of a platinum catalyst in absolute ethanol, after which the mixture was hydrogenized by means of hydrogen at room temperature under a pressure of 1.1 atm.

The absorption of hydrogen was interrupted after 2295 ccms. had been absorbed (=2 mol hydrogen/mol). The solution was filtered, the alcohol evaporated and the residue distilled in vacuo. The yield was 14.5 gs. (=98%). Boiling point 160 to 162° C./2.5 mms. Equivalent weight 151.5 (calculated 147).

EXAMPLE II

N-(2-Diethyl-Amino-Ethyl)Dihydro-β-Ionylamine N,N-Diethyl - N' - [1 - Methyl - 3-(2',6',6'-Trimethyl-Cyclohexene-1'-Yl) Propyl]-Ethylene Di-Amine (Formula II)

38.4 gs. of β-ionone and 23.2 gs. of N,N-diethyl-ethylene diamine were dissolved in 200 mls. of ethanol. To the mixture was added a suspension of a platinum catalyst in a certain quantity of ethanol. The mixture was hydrogenized and then the reaction mixture was filtered and to the filtrate was added 200 mls. of 2 N hydrochloric acid. The alcoholic, aqueous layer was then washed three times with petroleum ether, then rendered alkaline and again extracted with petroleum ether. The latter extracts were dried on solid potassium hydroxide. The petroleum ether was evaporated and the residue distilled in vacuo. The yield was 64%. Boiling point 118 to 120° C./0.05 mm. Equivalent weight 154 (calculated 147).

EXAMPLE III

N,N' - Bis[1 - Methyl-3-(2',6',6'-Trimethyl-Cyclohexene-1'-Yl) Propyl] Hexamethylene Di-Amine (Formula III)

200 mgs. of platinum oxide was prehydrogenized in 10 mls. of ethanol. To this suspension was added 29.5 gs. of β-ionone (0.154 mol), dissolved in 40 mls. of ethanol and 8.6 gs. of 69% hexamethylene di-amine (0.051 mol) in 20 mls. of ethanol and the reaction mixture was hydrogenized at room temperature, under a pressure of 1.1 atm. When 66 ccms. of hydrogen had been absorbed, the catalyst was filtered off and to the filtrate was added 100 mls. of 2 N hydrochloric acid. The aqueous, alcoholic solution was shaken a few times with in total 400 mls. of petroleum ether and once with a mixture of ether and petroleum ether. The extracted liquid was then rendered alkaline by means of 20 mls. of 50% caustic soda, after which the amine set free was extracted with petroleum ether. These extracts were dried on solid sodium hydroxide and filtered. After evaporating the solvent a clear, very viscous liquid remained. The yield was 23.8 gs. (=99%). Equivalent weight 240 (calculated 236).

Production of the Hydrochloride 0.8 g. of the amine was dissolved in 2 mls. of ethanol and this solution was neutralized by means of alcoholic hydrochloric acid. By adding a few mls. of di-ethyl ether and then a few mls. of petroleum ether, an oil was precipitated. When drying in air, this oil produces slowly a solid substance. This substance was recrystallized from acetone. Melting point 168 to 170° C. Chlorine content 12.95% (calculated 13.03%).

EXAMPLE IV

N-(3-Amino-Propyl)-β-Ionyl Amine N-[1-Methyl-3-(2', 6',6' - Trimethyl - Cyclohexene - 1' - Yl)Propene - 2-Yl]Propylene Di-Amine (Formula IV)

9 gs. (0.12 mol) of 1.3-di-amino propane and 90.2 gs. (0.10 mol) of β-ionone was added together with 50 mls. of absolute ethanol to a prehydrogenized suspension of 0.2 g. of platinum oxide in 25 mls. of absolute ethanol and the mixture was hydrogenized. When no hydrogen was any more absorbed, the reaction mixture was filtered, diluted with 200 mls. of 2 N hydrochloric acid and evaporated partly. This solution was washed with petroleum ether and rendered alkaline by means of 25 mls. of 50% caustic soda. The amine this separated out was washed in petroleum ether, the solution was dried on sodium hydroxide and after evaporating the solvent the residue was fractionated in vacuo. Yield 14 gs. (54%). Boiling point 123° C./0.4 mm. Equivalent weight 129 (calculated 125).

EXAMPLE V

N-(3-Dimethyl-Amino Propyl) Tetrahydro-ψ-Ionyl Amine N,N - Dimethyl - N' - (1,5,9 - Trimethyldecene - 8 - Yl) Trimethylene Di-Amine (Formula V)

38.4 gs. (0.2 mol) of ψ-ionone was dissolved in 300 mls. of absolute ethanol and with a suspension of a platinum catalyst hydrogenized to obtain tetrahydro-ψ-ionone. To the mixture was added 20 gs. (0.2 mol) of N,N-dimethyltrimethylene di-amine and this mixture was hydrogenized until no hydrogen was any more absorbed. The reaction mixture was filtered and acidified with concentrated hydrochloric acid. The ethanol was evaporated and to the residue was added 500 mls. of water. The aqueous solution was washed twice with di-ethyl ether and then rendered alkaline with 50% caustic soda. The oil layer thus formed was dissolved in di-ethyl ether and the etheric solution was dried on sodium sulphate. After filtering and evaporating the di-ethyl ether the residue was distilled in vacuo. The yield was 55.5 gs. (63%). Boiling point 150 to 152° C./1.4 mms. Equivalent weight 288 (calculated 282).

EXAMPLE VI

N-(-2-Diethyl-Amino Ethyl) Tetrahydro-ψ-Ionyl Amine N,N - Diethyl - N' - (1,5,9 - Trimethyldecene - 8 - Yl) Ethylene Di-Amine (Formula VI)

This compound was produced from tetrahydro-ψ-ionone and N,N-di-ethyl-ethylene di-amine in the same manner as described in the preceding example. Yield 29 gs. (49%). Boiling point 142 to 145° C./0.8 mm. Equivalent weight 302 (calculated 296).

EXAMPLE VII

N - Benzyl - N(2 - Diethyl - Amino - Ethyl) Dihydro - β-Ionyl Amine N,N-Diethyl-N'-Benzyl-N'[1-Methyl-3-(2',6',6' - Trimethyl - Cyclohexene - 1' - Yl) Propyl] Ethylene Di-Amine (Formula VII)

15 gs. of N-(2-diethyl-amino-ethyl)-dihydro-β-ionyl amine and 6.5 gs. of benzyl chloride were dissolved in 75 mls. of absolute ethanol and boiled for seven hours, whilst moist was excluded. Then the alcohol was evaporated and the residue was dissolved in 25% alcohol. The amine was separated out of this solution by means of caustic soda and dissolved in petroleum ether. This solution was evaporated to dryness and the residue was fractionated in vacuo. Yield: 6 gs. (31%). Boiling point 202 to 203° C./1.2 mms. Equivalent weight 193 (calculated 192).

EXAMPLE VIII

N,N-Diethyl-N'-Furfuryl-N'-(Dihydro-β-Ionyl) Ethylene Di - Amine N,N - Diethyl - N' - (2 - Furyl - Methyl)-N' - [1 - Methyl - 3 - (2',6',6' - Trimethyl - Cyclohexene-1'-Yl) Propyl] Ethylene Di-Amine (Formula VIII)

To a solution of 21.5 gs. (0.078 mol) of N-furfuryl-dihydro-β-ionyl amine and 6.2 gs. (0.078 mol) of pyridine in 100 mls. of benzene was added, whilst stirred, a solution of 8.2 gs. (0.073 mol) of 2-chlorine-acetylchloride in 50 mls. of dry benzene in drops at room temperature. Then the mixture was stirred for half an hour and then boiled for one hour, whilst stirred. After cooling the precipitate of the hydrochloric acid salt of pyridine was sucked off. The filtrate was washed twice with 50 mls. of water and dried on sodium sulphate. After filtering and evaporation of the benzene, the residue was kept for some time in high vacuum, in order to remove the last remains of solvent. The yield of crude N-(2-chlorine acetyl)-N-furfuryl-dihydro-β-ionyl amine was 100%. 25 gs. of the product thus obtained was dissolved in a great excess of di-ethyl amine. After five hours at room temperature the excess of diethyl amine was evaporated in vacuo and the residue was dissolved in 75 mls. of absolute ether. Thus a deposit of di-ethyl amine hydrochloride was obtained. (90% of the theoretically obtainable value.) After filtering off this deposit, the filtrate was dried on sodium sulphate, filtered, evaporated to dryness and the residue was kept for some time in high vacuum. The yield of crude N-(2-diethyl-amine acetyl)-N-furfuryl-dihydro-β-ionyl amine was 100%. Equivalent weight 430 (calculated 390). N-content 7.6 and 7.2%. (Calculated 7.2%) 25 gs. (0.064 mol) of the crude product thus obtained was dissolved in 100 mls. of absolute di-ethyl ether, this solution was added to 15 gs. (0.38 mol) of lithium-aluminium hydride, suspended in 300 mls. of absolute ether, and the mixture was boiled for 20 hours, whilst stirred. Then the complex was decomposed by adding water. After sucking off, the filtrate was dried on sodium sulphate and after evaporation of the ether, the residue was distilled in vacuo. The yield was 80%. Boiling point 157 to 160° C./0.05 mm.

*Analysis.*—Found: C, 76.92 and 76.58%; H, 11.53 and 11.74%; N, 7.01; 7.01 and 7.20%. Calculated: C, 77.01%; H, 11.23%; N, 7.48%.

EXAMPLE IX

N,N-Diethyl-N' (2-Pyridyl)-N'-(Dihydro-β-Ionyl) Ethylene Di-Amine N,N-Diethyl-N'-(2-Pyridyl)-N'-[1-Methyl-3-(2',6',6'-Trimethyl Cyclohexene-1'-Yl) Propyl] Ethylene Diamine (Formula IX)

This compound was produced in a similar manner as described in the preceding example from N-(2-pyridyl)-dihydro-β-ionyl amine and monochlorine-acetylchloride, so that the corresponding N-(monochlorine-acetyl)-compound was obtained. This compound was converted by means of di-ethyl amine and the product thus obtained was reduced with lithium-aluminium hydride, suspended in di-ethyl ether, to obtain the compound referred to in this example. Yield 25%. Boiling point 137 to 140° C./0.04 mm. Equivalent weight 185 (calculated 185.5).

What is claimed is:

1. An alkylene diamine having spasmolytic properties and corresponding to the formula

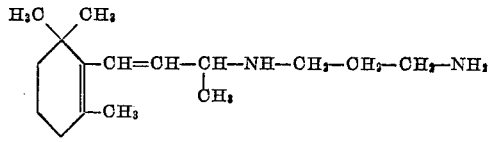

2. An alkylene diamine having spasmolytic properties and corresponding to the formula

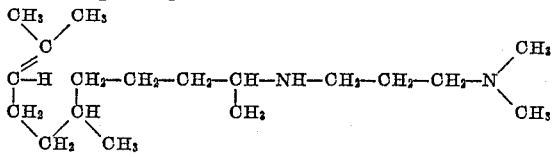

3. An alkylene diamine having spasmolytic properties and corresponding to the formula

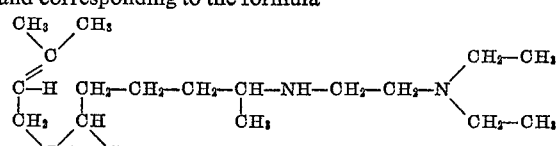

References Cited in the file of this patent

UNITED STATES PATENTS

| | | |
|---|---|---|
| 2,413,248 | Senkus | Dec. 24, 1946 |
| 2,502,151 | Horclois | Mar. 28, 1950 |
| 2,526,943 | Gailliot | Oct. 24, 1950 |
| 2,736,746 | Goldberg | Feb. 28, 1956 |
| 2,739,981 | Szabo | Mar. 27, 1956 |

FOREIGN PATENTS

| | | |
|---|---|---|
| 862,013 | Germany | Jan. 8, 1953 |

OTHER REFERENCES

Wagner and Zook: "Synthetic Org. Chem.," pp. 662–3 (1953).